(12) United States Patent
Cui et al.

(10) Patent No.: US 12,369,060 B2
(45) Date of Patent: Jul. 22, 2025

(54) CSSF DESIGN FOR UE WITH NEEDFORGAP CAPABILITY

(71) Applicant: Apple Inc., Cupertino, CA (US)

(72) Inventors: Jie Cui, San Jose, CA (US); Dawei Zhang, Saratoga, CA (US); Hong He, Cupertino, CA (US); Huaning Niu, San Jose, CA (US); Manasa Raghavan, Sunnyvale, CA (US); Qiming Li, Beijing (CN); Xiang Chen, Cupertino, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 17/917,861

(22) PCT Filed: Oct. 21, 2021

(86) PCT No.: PCT/CN2021/125305
§ 371 (c)(1),
(2) Date: Oct. 7, 2022

(87) PCT Pub. No.: WO2023/065216
PCT Pub. Date: Apr. 27, 2023

(65) Prior Publication Data
US 2023/0284057 A1 Sep. 7, 2023

(51) Int. Cl.
*H04W 24/10* (2009.01)
*H04W 56/00* (2009.01)

(52) U.S. Cl.
CPC ....... *H04W 24/10* (2013.01); *H04W 56/0015* (2013.01)

(58) Field of Classification Search
CPC ......... H04W 72/0446; H04W 56/0045; H04W 36/0088; H04W 24/08; H04W 24/10;
(Continued)

(56) References Cited

U.S. PATENT DOCUMENTS

| 10,764,777 B2 * | 9/2020 | Yang ................... H04L 5/0078 |
| 11,438,858 B2 * | 9/2022 | Yang ................. H04W 56/0065 |

(Continued)

FOREIGN PATENT DOCUMENTS

| CN | 107743719 | 2/2018 |
| CN | 107820726 | 3/2018 |

(Continued)

OTHER PUBLICATIONS

Extended European Search Report for EP Patent Application No. 21960966.6; Nov. 6, 2024.
(Continued)

*Primary Examiner* — Jung Liu
(74) *Attorney, Agent, or Firm* — Kowert, Hood, Munyon, Rankin & Goetzel, P.C.

(57) ABSTRACT

Methods, apparatuses, and systems are disclosed for configuring measurement timings in connection with UEs that are capable of signaling whether a measurement gap (MG) is needed to measure a target frequency carrier. For example, a measurement period may be determined for the target frequency carrier based on the UE indicating that it supports per-frequency range (FR) MGs, and determining that the FR of the target frequency carrier does not include any current serving cell(s). If the UE indicates that no MG is needed to measure the target frequency carrier, then the measurement period may be based on an SMTC, and may be further based on a predefined effective measurement gap repetition period (MGRP). If the UE indicates that a MG is needed, then the measurement period may be based on the SMTC, and may be further based on the effective MGRP or a per-UE MGRP.

20 Claims, 7 Drawing Sheets

(58) Field of Classification Search
CPC ................ H04W 56/001; H04W 36/08; H04L 27/2656; H04L 27/2602
See application file for complete search history.

(56) References Cited

U.S. PATENT DOCUMENTS

| | | | |
|---|---|---|---|
| 11,800,415 B2* | 10/2023 | Yang | H04W 56/0045 |
| 11,956,660 B2* | 4/2024 | Orsino | H04W 76/19 |
| 12,177,147 B2* | 12/2024 | Hu | H04L 5/0048 |
| 2019/0246306 A1* | 8/2019 | Yang | H04L 27/26 |
| 2021/0051618 A1* | 2/2021 | Yang | H04W 48/08 |
| 2021/0227413 A1* | 7/2021 | Yang | H04W 72/0446 |
| 2021/0297970 A1 | 9/2021 | Tang et al. | |
| 2022/0132348 A1* | 4/2022 | Orsino | H04W 76/27 |
| 2022/0174623 A1* | 6/2022 | Zheng | H04W 24/08 |
| 2022/0247534 A1* | 8/2022 | Hu | H04L 5/0001 |
| 2023/0046505 A1* | 2/2023 | Hu | H04W 24/10 |
| 2023/0109518 A1* | 4/2023 | Hwang | H04W 24/10 370/350 |
| 2023/0123943 A1* | 4/2023 | Yokokawa | H04W 88/02 370/252 |
| 2023/0127719 A1* | 4/2023 | Kim | H04W 24/10 370/329 |
| 2023/0179293 A1* | 6/2023 | Hwang | H04W 48/16 455/12.1 |
| 2023/0239717 A1* | 7/2023 | Gao | H04B 7/18563 370/252 |
| 2024/0063894 A1* | 2/2024 | Vogedes | H04B 7/18541 |
| 2024/0080694 A1* | 3/2024 | Yang | H04W 36/0088 |
| 2024/0098611 A1* | 3/2024 | Da Silva | H04W 24/08 |
| 2024/0244469 A1* | 7/2024 | Axmon | H04W 72/1268 |
| 2024/0349097 A1* | 10/2024 | Kazmi | H04W 48/16 |
| 2024/0373305 A1* | 11/2024 | Tang | H04W 36/0088 |

FOREIGN PATENT DOCUMENTS

| | | |
|---|---|---|
| CN | 110622584 | 12/2019 |
| WO | 2020060951 | 3/2020 |
| WO | 2021204239 | 10/2021 |

OTHER PUBLICATIONS

"3rd Generation Partnership Project; Technical Specification Group Radio Access Network; NR; Requirements for support of radio resource management (Realease 16)"; 3GPP TS 38133-G90 v16.9.0; Sep. 2021.

International Search Report and Written Opinion for PCT Patent Application No. PCT/CN2021/125305; 9 pages; Jul. 20, 2022.

CATT "CR on CSI-RS based UE measurement capabilities"; 3GPP TSG-RAN4 Meeting #95-e R4-2006229; 12 pages; Jun. 5, 2020.

CMCC "CR on introducing inter-frequency measurements without measurement gap (9.1.5, 9.1.6, 9.3.1, 9.3.4, 9.3.5)"; 3GPP TSG-RAN WG4 meeting #95e R4-2006807; 17 pages; May 25, 2020.

Office Action for JP 2024-523900; Jan. 21, 2025.

Huawei et al. "Discussion on NCSG"; 3GPP TSG RAN WG4 Meeting #100e R4-2114307; Aug. 16, 2021.

CATT "Draft CR on CSI-RS based measurement requirements"; 3GPP TSG RAN4 Meeting #100e R4-2115322; Aug. 16, 2021.

Ericsson "Requirements on measurements outside gaps for FR2"; 3GPP TSG RAN4 Meeting #94e R4-2001407; Feb. 24, 2020.

NEC "Discussion on concurrent and independent MG"; 3GPP TSG RAN WG4 Meeting #98e R4-2104982; Apr. 12, 2021.

* cited by examiner

CSSF DESIGN FOR UE WITH NEEDFORGAP CAPABILITY

PRIORITY CLAIM

This application is a national phase entry of PCT application number PCT/CN2021/125305, entitled "CSSF Design for UE with NeedForGap Capability," filed Oct. 21, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for configuring measurement timings in cellular communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, as diverse UE capabilities are integrated with more traditional UE devices, UEs and networks may require new procedures for signaling and adapting to the capabilities of each UE in the network. Accordingly, improvements in the field are desired.

The ever-increasing number of features and functionality introduced in wireless communication devices also creates a continuous need for improvement in both wireless communications and in wireless communication devices. In particular, as wireless communications devices become more capable, e.g., by including multiple RF chains and other capabilities, signaling and resource management may become increasingly complex. Accordingly, improvements in the field are desired.

SUMMARY

Embodiments are presented herein of apparatuses, systems, and methods for configuring measurement timings in connection with UEs that are capable of signaling whether a measurement gap is needed for a target measurement object.

For example, a method is disclosed, which may be performed by a user equipment (UE). The UE may indicate to a cellular communication network that the UE supports per-frequency range (FR) measurement gaps (MGs). The UE may determine whether the FR of the first frequency carrier contains at least one current serving cell. The UE may indicate to the cellular communication network that no MG is needed for measurement of a first frequency carrier. In response to determining that the FR of the first frequency carrier does not contain at least one current serving cell, the UE may determine a measurement period for the first frequency carrier based on a predetermined measurement timing configuration configured by the cellular communication network. The UE may perform at least one measurement of the first frequency carrier according to the determined measurement period.

In some scenarios, the predetermined measurement timing configuration may be a synchronization signal block measurement timing configuration (SMTC).

In some scenarios, determining the measurement period may be further based on a predefined effective measurement gap repetition period (MGRP).

In some scenarios, determining the measurement period may include determining at least one of: a minimum of the predetermined measurement timing configuration and the effective MGRP; or a maximum of the predetermined measurement timing configuration and the effective MGRP.

In some scenarios, in which all configured measurement occasions for the first frequency carrier fully overlap a MG configured for the FR of the first frequency carrier, the method may further include applying a carrier-specific scaling factor (CSSF) to adjust the measurement time for the UE to perform channel measurements within the MG.

A method is disclosed, which may be performed by a user equipment (UE). The UE may indicate to a cellular communication network that the UE supports per-frequency range (FR) measurement gaps (MGs). The UE may determine whether the FR of the first frequency carrier contains at least one current serving cell. The UE may indicate to the cellular communication network that a MG is needed for measurement of a first frequency carrier. In response to determining that the FR of the first frequency carrier does not contain any current serving cell, the UE may determine a measurement period for the first frequency carrier based on a predetermined measurement timing configuration configured by the cellular communication network. The UE may perform at least one measurement of the first frequency carrier according to the determined measurement period.

In some scenarios, the predetermined measurement timing configuration may be a synchronization signal block measurement timing configuration (SMTC).

In some scenarios, determining the measurement period may be further based on a predefined effective measurement gap repetition period (MGRP).

In some scenarios, determining the measurement period may be further based on a per-UE measurement gap repetition period (MGRP).

In some scenarios, determining the measurement period may include determining at least one of a minimum of the predetermined measurement timing configuration and the per-UE MGRP; or a maximum of the predetermined measurement timing configuration and the per-UE MGRP.

A method is disclosed, which may be performed by a cellular communication network. The cellular communication network may receive an indication from a user equipment (UE) that the UE supports per-frequency range (FR) measurement gaps (MGs). The cellular communication network may provide to the UE a plurality of FR MGs, responsive to the indication that the UE supports per-FR MGs. The cellular communication network may provide to the UE an assignment to measure a first frequency carrier. The cellular communication network may determine whether the FR of the first frequency carrier contains at least one cell currently serving the UE. The cellular communication network may receive an indication from the UE that a MG is needed for measurement of the first frequency carrier. In response to determining that the FR of the first frequency carrier does not contain any cell currently serving the UE, and further in response to receiving the indication that the MG is needed for measurement of the first frequency carrier, the cellular communication network may determine a measurement period for the first frequency carrier based on a predetermined measurement timing configuration. The cellular communication network may perform measurement scheduling based on the determined measurement period.

In some scenarios, determining the measurement period may be further based on a predefined effective measurement gap repetition period (MGRP).

In some scenarios, determining the measurement period may be further based on a per-UE measurement gap repetition period (MGRP).

A method is disclosed, which may be performed by a user equipment (UE). The UE may indicate to a cellular communication network that the UE is not capable of carrier aggregation. The UE may determine whether a target measurement object is contained in an active bandwidth part (BWP) configured for the UE. In response to determining that the target measurement object is contained in the active BWP, the UE may indicate to the cellular communication network that a measurement gap (MG) is not needed for measuring the measurement object. In response to determining that the target measurement object is not contained in the active BWP, the UE may indicate to the cellular communication network that the MG is needed for measuring the measurement object.

In some scenarios, the measurement object may be a synchronization signal block (SSB).

In some scenarios, the UE may determine whether the target measurement object is an intra-frequency object. In response to determining that the target measurement object is an intra-frequency object, the UE may indicate to the cellular communication network that a measurement gap (MG) is not needed for measuring the measurement object, wherein determining whether the target measurement object is contained in the active BWP configured for the UE is performed in response to determining that the target measurement object is not an intra-frequency object.

In some scenarios, in response to determining that the target measurement object is an intra-frequency object, the UE may measure the target measurement object during a first measurement time instance, and measure a measurement object of a carrier associated with a current serving cell at a second, different measurement time instance.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
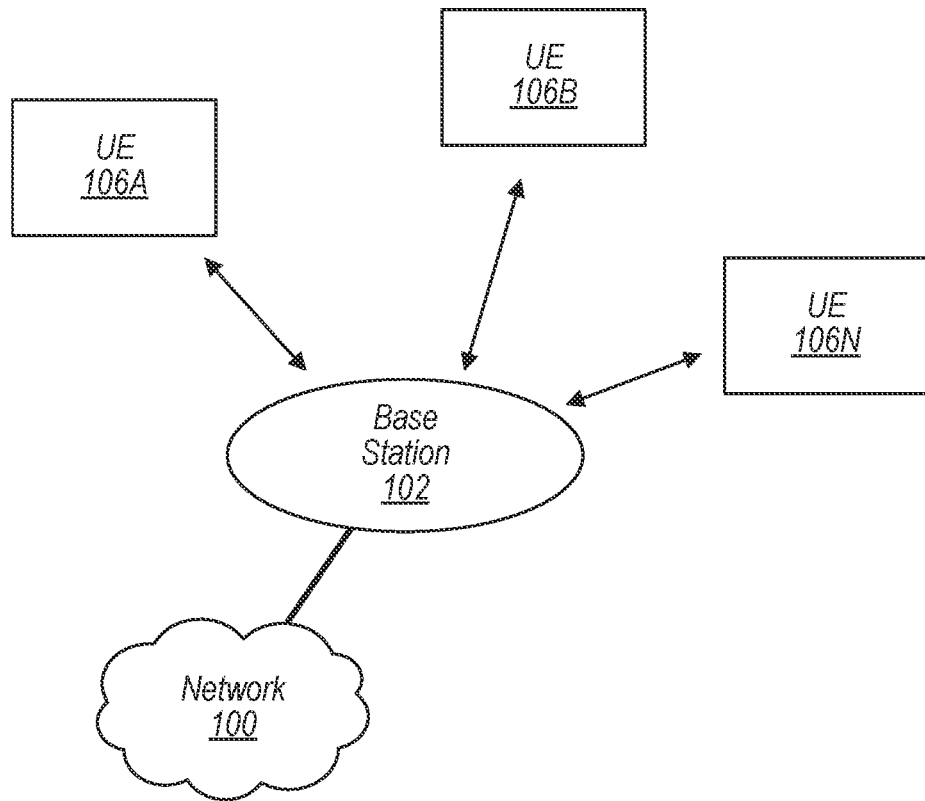
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
GSM: Global System for Mobile Communication
UMTS: Universal Mobile Telecommunication System
EUTRA: Evolved UMTS Terrestrial Radio Access
LTE: Long Term Evolution
NR: New Radio
TX: Transmission/Transmit RX: Reception/Receive
RAT: Radio Access Technology
MAC: Medium Access Control
GNSS: Global Navigation Satellite System
RSRP: Reference Signal Received Power
RSRQ: Reference Signal Received Quality
BWP: Bandwidth Part
MGRP: Measurement Gap Repetition Period
SSB: Synchronization Signal Block
SMTC: SSB Measurement Timing Configuration
CSSF: Carrier-Specific Scaling Factor Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")— any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
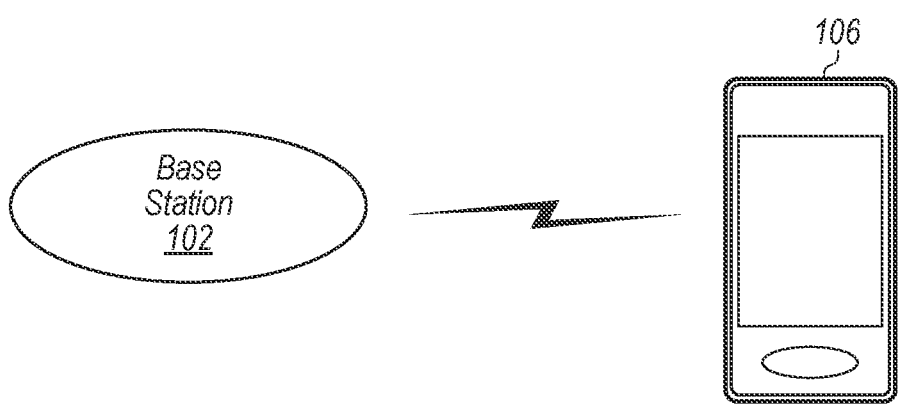
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to configure measurement timings, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
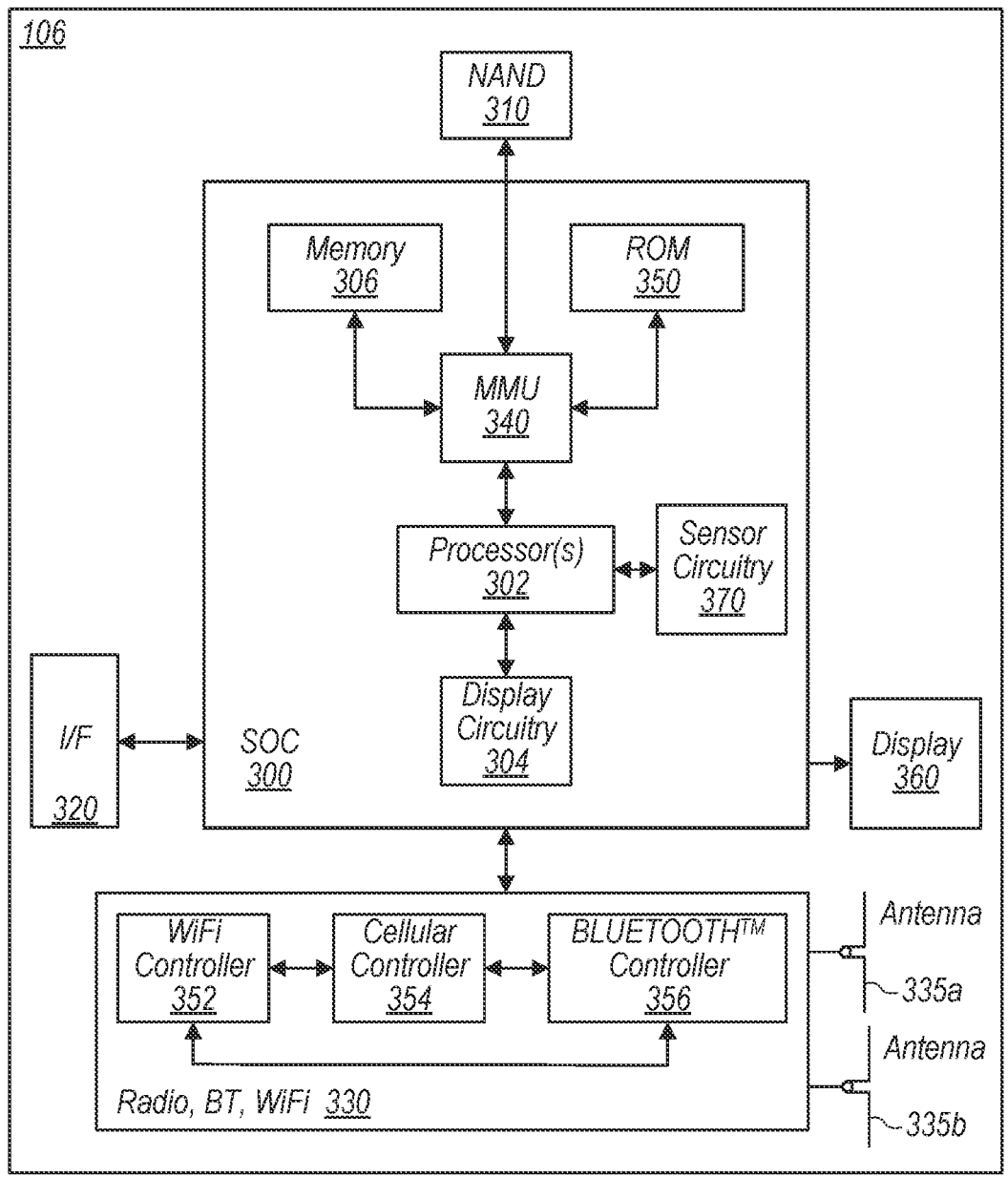
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. In some implementations, the display 360 may include a touchscreen capable of detecting user input, e.g., as touch events. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector interface (I/F) 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g., 335*a*), and possibly multiple antennas (e.g., illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to configure measurement timings, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to configure measurement timings according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE, LTE-A, and/or NR controller) 354, and BLUETOOTH™ controller 356, and in at least some embodiments, one or more of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
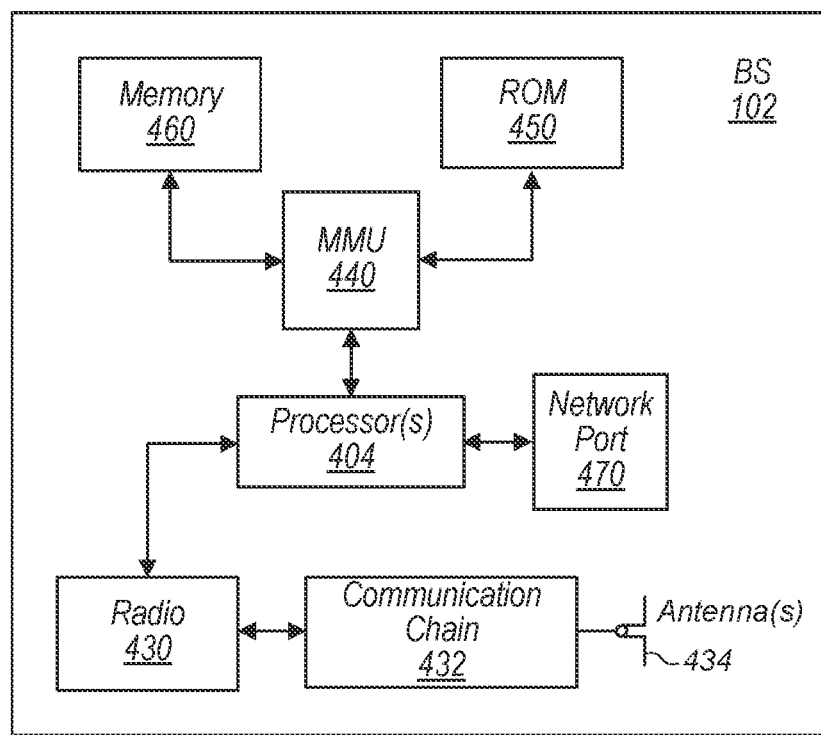
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE device 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Adjusting Measurement Timings

In various wireless communication systems, procedures such as cell handover, adding a new component carrier, etc., may be supported by a UE, such as the UE 106, periodically measuring characteristics of the present serving cell and/or one or more neighbor cells. Such characteristics may include cell signal strength and/or signal quality. For example, in 5G NR, the UE may measure reference signal received power (RSRP) and/or reference signal received quality (RSRQ).

To measure such characteristics, the UE may receive and measure one or more measurement objects (MOs), such as a synchronization signal block (SSB), which may be transmitted periodically by a base station, such as the base station 102. In some instances, the UE may measure less than all of the transmitted MOs. For example, the network may define a periodic SSB measurement timing configuration (SMTC) window, during which the UE may receive and measure an SSB. The UE may not measure SSBs transmitted outside the SMTC window. The network may communicate the SMTC window to the UE via the base station, e.g., via RRC signaling.

The network may also define one or more measurement gaps (MGs) for the UE. A MG may represent a periodic time window during which the UE may tune away from the current serving cell(s) to perform measurements on neighbor cells. The network may schedule communications between the UE and the serving cell(s) so as to not coincide with MGs, e.g., communications with the serving cell(s) may be suspended during the MGs. A MG may have a measurement gap length (MGL), which may be configured to be longer than, and to fully overlap, an SMTC window, such that the SMTC window may occur within the MG, for measurements requiring a MG. The MG may be periodic, with a period defined by a measurement gap repetition period (MGRP) parameter. The network may communicate information regarding MGs to the UE via the base station, e.g., within RRC signaling.

A MG may be utilized for measurement of neighboring cells that may not be measured without tuning away from the current serving cells. This may include, e.g., inter-frequency measurements, as well as intra-frequency measurements outside the UE's active bandwidth part (BWP). In some implementations, a UE may include multiple RF chains, such as one or more RF chains dedicated to each of a plurality of frequency ranges (FRs), such as those defined by 3GPP TS 38.101 v.17.3.0 (hereby incorporated by reference in its entirety), section 5. For example, a UE may include a first RF chain dedicated to performing communications within FR1 and a second RF chain dedicated to performing communications within FR2. In this scenario, the UE may be capable of performing measurements for a neighbor cell in FR2, using the second RF chain, without tuning away from a serving cell in FR1, as communications in FR1 may continue via the first RF chain. Thus, in some circumstances, the UE may be able to perform such measurements without a MG. The UE may therefore treat MGs somewhat independently in different FRs.

For this reason, in some implementations, the network may define a different MG configuration for each of a plurality of FRs for a given UE. These may be referred to as per-FR MGs. In other implementations, the network may define only a single MG for use by the UE in all FRs and/or all carriers. This may be referred to as a per-UE MG. In some implementations, the UE may signal to the network whether it is capable of supporting per-FR MGs. If the UE signals that it is not capable of supporting per-FR MGs, then the network may utilize only a per-UE MG for that UE.

In some implementations, the UE may signal to the network (e.g., via the base station 102) whether a MG is needed for a particular measurement configuration. For example, the UE may provide an indication of whether it needs a MG to perform an intra-frequency measurement, and may provide a distinct indication of whether it needs a MG to perform an inter-frequency measurement. In some scenarios, the UE may provide an indication of whether it needs a MG to perform a measurement on a particular frequency carrier. For example, the UE may be configured to provide an indication of whether a MG is needed for each carrier the UE is assigned by the network to measure. In some implementations, these indications may be communicated by the UE to the network as one or more NeedForGap parameters. In some implementations, the UE may communicate this information to the network, e.g., within an information element or other field of a control signal or data signal. Whether the UE needs a MG to perform a particular measurement may depend upon the UE's RF chain resources as well as carrier condition.

When performing measurements, the UE may utilize a measurement resource, such as a memory or buffer, e.g., to buffer control signals and/or data from the carrier to be measured. In some scenarios, the UE may be assigned to perform multiple measurements (e.g., measurements on multiple cells/carriers). In such scenarios, the UE may share the measurement resource across the multiple measurements. This may accordingly increase the measurement time used to perform the measurements. For example, if a UE is configured with a measurement resource configured to accommodate measuring one carrier per time instance (also referred to as the UE having one "searcher"), then the measurement time may be doubled if the UE is tasked to measure two carriers. Alternatively, a UE configured with multiple RF chains, or other advanced capabilities, may include measurement resources configured to accommodate measuring multiple carriers per time instance (i.e., the UE may have multiple searchers). In some implementations, the UE may indicate to the network the number of searchers it supports.

In scenarios in which a measurement resource is shared, a carrier-specific scaling factor (CSSF) may be used. The CSSF may be calculated by the network to scale the measurement delay requirements, e.g., as specified by 3GPP TS 38.133 (incorporated herein by reference in its entirety). In some implementations, the network may calculate a first CSSF for use inside a MG and a second, different CSSF for use outside a MG.

As UEs advance in capabilities, UE behaviors may be defined based on those capabilities. For example, a UE's CSSF configuration and/or measurement period may be affected by the UE's MG capabilities, the number of searchers supported by the UE, etc. In particular, a UE's CSSF configuration and/or measurement period may be affected if the UE signals that it does not need a MG for a particular frequency carrier.

As a first example, if a UE is not capable of carrier aggregation (CA), it may signal a need for gap for any carrier in which the SSB cannot be fully contained in the UE's active BWP. Specifically, if the UE is not capable of CA, then it may be assumed to have only one applicable RF chain, such that the UE must tune away from the current serving cell in order to measure an SSB (or other MO) outside of the UE's active BWP. For a carrier in which the SSB can be fully contained in the UE's active BWP, the UE may indicate no need for gap. Specifically, the UE may receive the entire BWP while remaining connected to the current serving cell, and may therefore receive and measure the SSB within the BWP without tuning away. Thus, no MG is needed for the measurement. In some scenarios, this UE behavior may be applied regardless of whether the measurement carrier is an inter-frequency or intra-frequency carrier.

Figure 5:
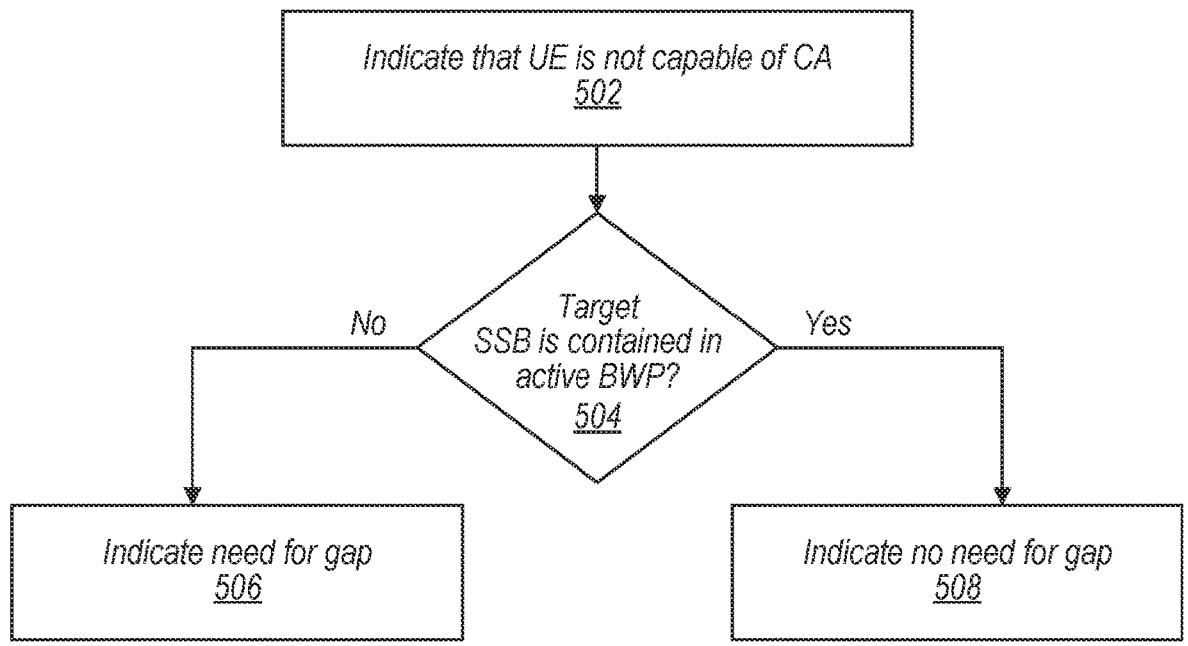
FIG. 5 is a flowchart diagram illustrating a method for determining whether a measurement gap (MG) is needed, according to some embodiments.

FIG. 5 is a flow chart diagram illustrating a method for determining whether a MG is needed, according to some embodiments. The method of FIG. 5 may be performed by a UE, such as the UE 106, or by some component thereof, such as by the radio 330 and/or the cellular controller 354. As shown, the method of FIG. 5 may operate as follows.

At 502, the UE 106 may indicate to the network that the UE 106 is not capable of CA.

At 504, the UE may determine whether the target SSB is fully contained in the UE's active BWP. If not, the UE may, at 506, indicate a need for gap. However, if the UE determines at 504 that the target SSB is fully contained in the active BWP, then the UE may, at 508, indicate no need for gap.

In some implementations, the method illustrated in FIG. 5 may apply to both intra-frequency and inter-frequency measurements.

However, in some implementations, the UE may behave differently if the measurement carrier is an intra-frequency carrier. For example, the UE may signal no need for gap for an intra-frequency carrier, even if the SSB cannot be fully contained in the UE's active BWP. Specifically, the UE may be capable of extending its RF filters beyond the BWP, to allow its RF chain to receive and measure the specified intra-frequency measurement carrier without tuning away from the current serving cell. However, in such a scenario, the UE may be limited to measuring only one frequency MO without a MG per time instance, because it may be assumed that a UE that is not CA capable may have only one searcher. Thus, the UE may be constrained to measure the current serving cell and the intra-frequency target neighbor cell at different time instances, e.g., in a time-division multiplex (TDM) manner.

Figure 6:
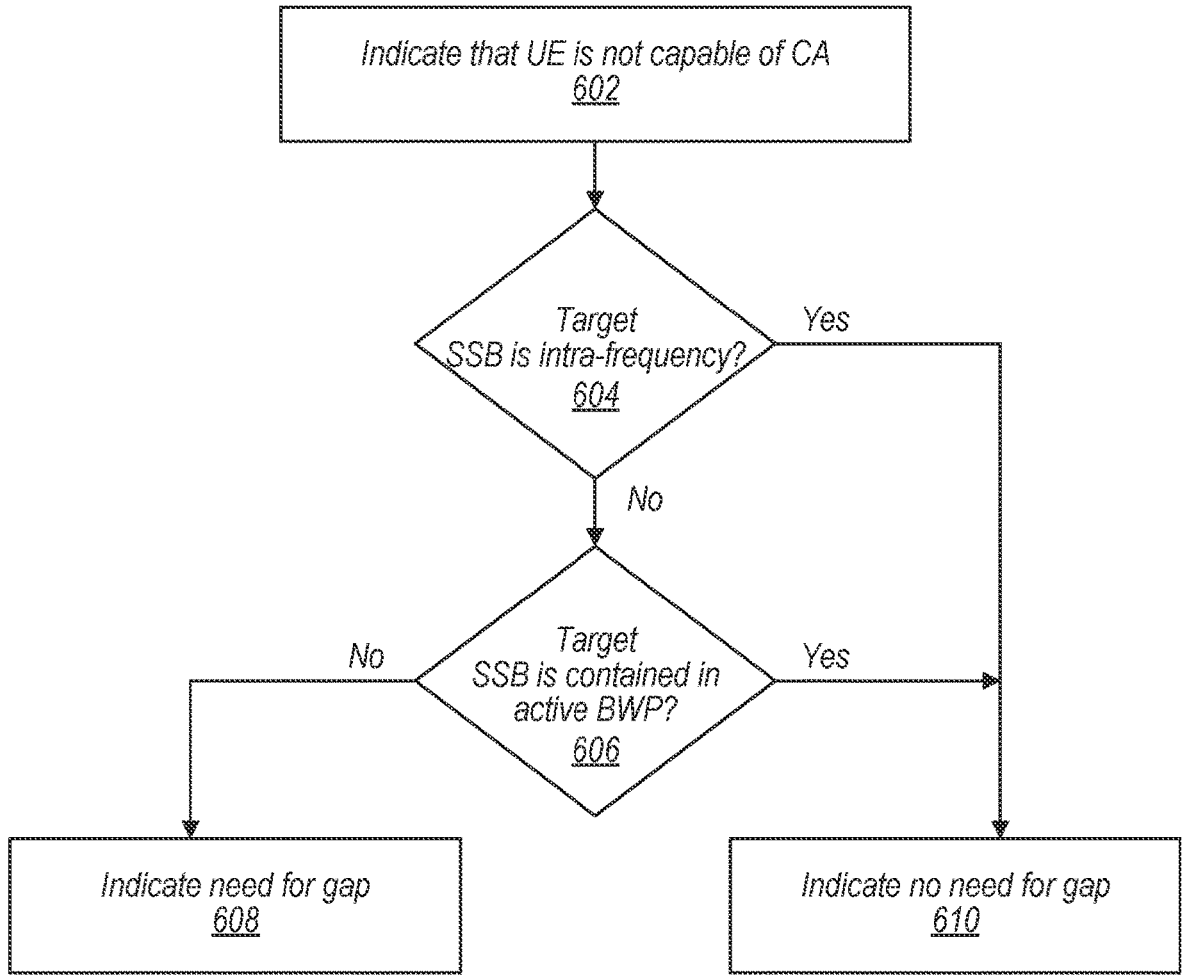
FIG. 6 is a flowchart diagram illustrating a method for determining whether a MG is needed in intra-frequency or inter-frequency measurements, according to some embodiments.

FIG. 6 is a flow chart diagram illustrating a method for determining whether a MG is needed in intra-frequency or inter-frequency measurements, according to some embodiments. The method of FIG. 6 may be performed by a UE, such as the UE 106, or by some component thereof, such as by the radio 330 and/or the cellular controller 354. As shown, the method of FIG. 6 may operate as follows.

At 602, the UE 106 may indicate to the network that the UE 106 is not capable of CA.

At 604, the UE may determine whether the target SSB is an intra-frequency SSB. If not, then the target SSB is an inter-frequency SSB, and may be treated much as in the method of FIG. 5. Specifically, the UE may, at 606, determine whether the target SSB is fully contained in the UE's active BWP. If not, the UE may, at 608, indicate a need for gap. However, if the UE determines at 606 that the target SSB is fully contained in the active BWP, then the UE may, at 610, indicate no need for gap.

If, at 604, the UE determines that the target SSB is an intra-frequency SSB, then the UE may, at 610, indicate no need for gap, regardless of whether the target SSB is contained in the active BWP.

According to these behaviors, there is no case in which the UE will be assigned to perform more than one measurement simultaneously within the MG window. Specifically, the if the UE indicates a need for gap, then during the MG window, the UE will tune away to measure a specific carrier. Because the UE is not CA capable, it may be assigned only a single frequency carrier to tune to within the MG. Thus, according to these behaviors, no adjustments are needed to a CSSF inside the MG for a UE that is not capable of CA. Similarly, no adjustments are needed to a CSSF outside the MG for a UE that is not capable of CA, at least where the SSB cannot be fully contained in the UE active BWP, because the UE may be constrained to measure only one MO without MG per time instance, as described above.

As a second example, the UE may indicate that it can support per-FR MG, and the network may therefore configure a MG for each FR for the UE. However, in this example, the UE may further indicate that it does not need a MG to measure a particular target frequency carrier that is on a different FR than the current serving cell(s). Because the FR of the target frequency carrier includes no current serving cell, the UE may utilize an RF chain dedicated to that FR to measure the target frequency carrier without tuning away from any serving cell, meaning that the UE need not be constrained by the MG configured by the network for that FR. The UE and/or network may therefore determine a measurement period for the target frequency carrier that is different (e.g., shorter) than the MGRP configured by the network.

3GPP TS 38.133 v.17.3.0 section 9.1.2 defines "effective MGRP" values to be used in scenarios in which there is no serving cell in the FR of a target frequency carrier. The effective MGRP is defined as 20 ms for FR2 and 40 ms in other cases. However, that document does not account for scenarios in which the UE signals that it does not need a gap for the target frequency carrier. In the present example, in which the UE signals that it does not need a gap for the target frequency carrier, the UE behavior may be adjusted, such that the UE and/or network may instead determine the measurement period based on the period of the SMTC defined for the target frequency carrier. For example, the period of the SMTC may be used as the measurement period. Alternatively, the UE and/or network may determine the measurement period based on both the period of the SMTC defined for the target frequency carrier and the effective MGRP of the FR. For example, the measurement period may be determined to be the minimum, the maximum, the average, or some other function of the period of the SMTC and the effective MGRP.

Figure 7:
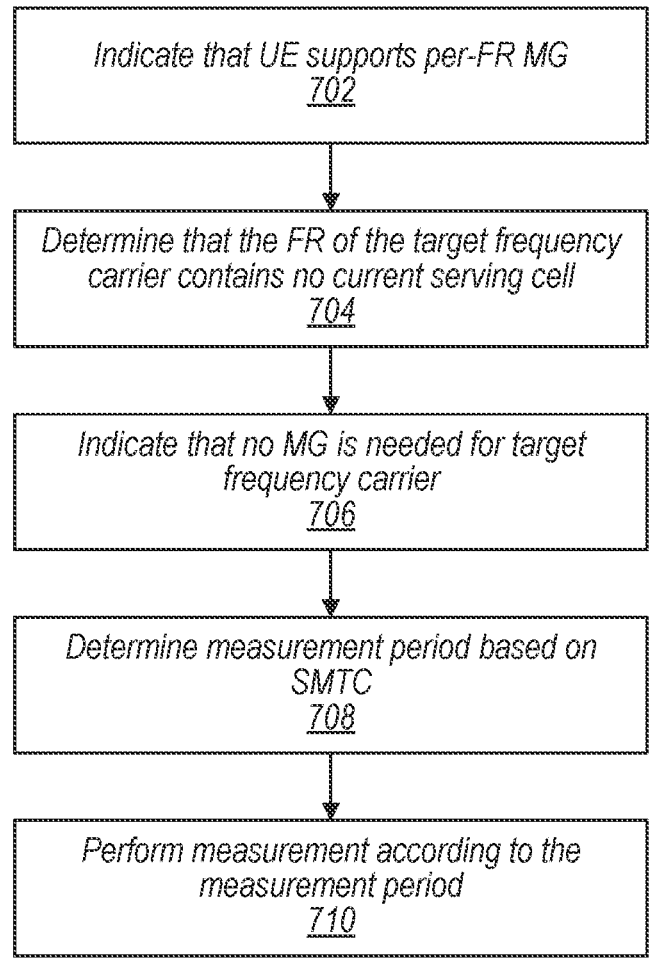
FIG. 7 is a flowchart diagram illustrating a method for determining a measurement period for a target frequency carrier in which no MG is needed, according to some embodiments.

FIG. 7 is a flow chart diagram illustrating a method for determining a measurement period for a target frequency carrier in which no MG is needed, according to some embodiments. The method of FIG. 7 may be performed by a UE, such as the UE 106, or by some component thereof, such as by the radio 330 and/or the cellular controller 354. As shown, the method of FIG. 7 may operate as follows.

At 702, the UE 106 may indicate to the network that the UE supports per-FR MG.

At 704, the UE 106 may determine that the FR of a target frequency carrier contains no current serving cell(s).

At 706, the UE 106 may indicate that the UE does not need a MG for measuring the target frequency carrier. It should be appreciated that the UE 106 may perform 704 and 706 concurrently or in opposite order without impacting the operation of the illustrated method.

In response to determining that the FR of the target frequency carrier contains no current serving cell(s) and that no MG is needed for the target frequency carrier, the UE 106 may, at 708, determine a measurement period for the target frequency carrier based at least in part on the period of the SMTC assigned to the target frequency carrier. In some scenarios, as described above, the measurement period may be further based on the effective MGRP.

At 710, the UE 106 may perform one or more measurements of the target frequency carrier according to the measurement period determined at 708.

The network may similarly determine the measurement period for the frequency carrier, based on the same criteria, to perform measurement scheduling for the UE 106 and other UEs in the network. For example, the UE may utilize the determined measurement period to perform mobility control. As a specific example, the UE may shorten the period for transmitting reference signals for the UE 106, to a time not less than the determined measurement period, e.g., to speed up measurement for mobility performance.

As a third example, the UE may indicate that it can support per-FR MG, and the network may therefore configure a MG for each FR for the UE. Further, in this example, the UE may further indicate that it needs a MG to measure a particular target frequency carrier, despite the target frequency carrier being on a different FR than the current serving cell(s). Despite the indication of a need for a MG, the FR of the target frequency carrier includes no current serving cell, so the UE may utilize an RF chain dedicated to that FR to measure the target frequency carrier without tuning away from any serving cell, meaning that the UE need not be constrained by the MG configured by the network for that FR. The UE and/or network may therefore determine a measurement period for the target frequency carrier that is shorter than the MGRP configured by the network. For example, the measurement period may be determined according to any of the options described in connection with the second example.

Alternatively, in this third example, the UE and/or network may determine a measurement period for the target frequency carrier based on a per-UE MGRP and SMTC defined for the target frequency carrier. Specifically, despite the indication that the UE supports per-FR MG, the UE also indicated a need for MG to measure a target frequency carrier in a FR that has no current serving cell. Thus, the UE is behaving in a manner consistent with a per-UE MG, and the measurement period may therefore be determined based on the per-UE MGRP.

Figure 8:
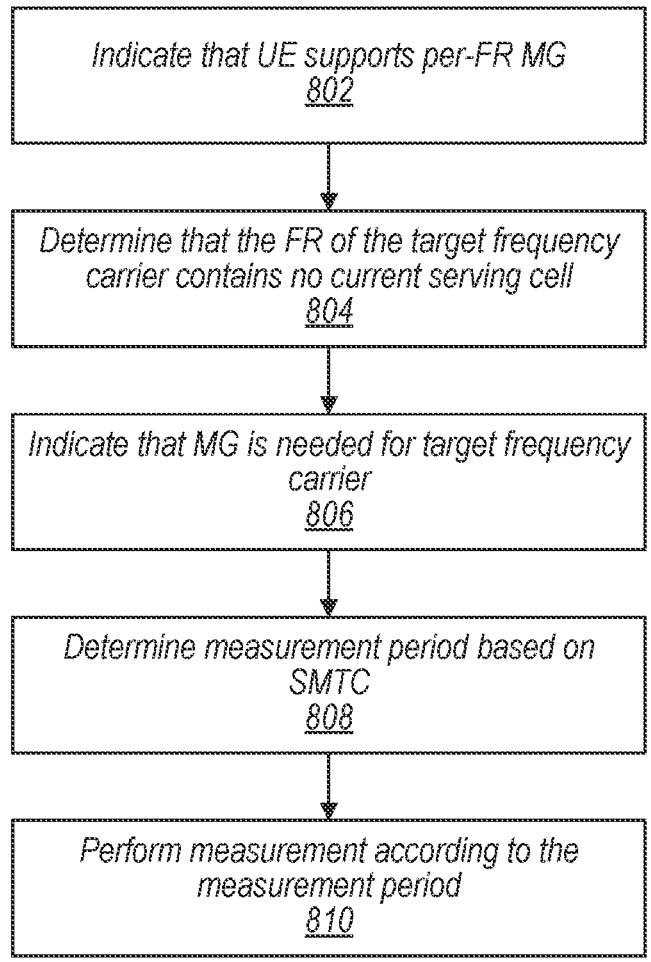
FIG. 8 is a flow chart diagram illustrating a method for determining a measurement period for a target frequency carrier in which a MG is needed, according to some embodiments.

FIG. 8 is a flow chart diagram illustrating a method for determining a measurement period for a target frequency carrier in which a MG is needed, according to some embodiments. The method of FIG. 8 may be performed by a UE, such as the UE 106, or by some component thereof, such as by the radio 330 and/or the cellular controller 354. As shown, the method of FIG. 8 may operate as follows.

At 802, the UE 106 may indicate to the network that the UE supports per-FR MG.

At 804, the UE 106 may determine that the FR of a target frequency carrier contains no current serving cell(s).

At 806, the UE 106 may indicate that the UE needs a MG for measuring the target frequency carrier. It should be appreciated that the UE 106 may perform 804 and 806 concurrently or in opposite order without impacting the operation of the illustrated method.

In response to determining that the FR of the target frequency carrier contains no current serving cell(s), the UE 106 may, at 808, determine a measurement period for the target frequency carrier based at least in part on the period of the SMTC assigned to the target frequency carrier. In some scenarios, as described above, the measurement period may be further based on the effective MGRP or the per-UE MGRP.

At 810, the UE 106 may perform one or more measurements of the target frequency carrier according to the measurement period determined at 808.

The network may similarly determine the measurement period for the frequency carrier, based on the same criteria, to perform measurement scheduling for the UE 106 and other UEs in the network. For example, the UE may utilize the determined measurement period to perform mobility control. As a specific example, the UE may shorten the period for transmitting reference signals for the UE 106, to a time not less than the determined measurement period, e.g., to speed up measurement for mobility performance.

As a fourth example, when the UE has indicated that it can support per-FR MG, the UE may be constrained to always indicate that it does not need a MG to measure any target frequency carrier on a different FR than the current serving cell(s). In such scenarios, the UE and/or network may determine the measurement period based on the period of the SMTC defined for the target frequency carrier.

These UE behaviors may also affect CSSF, particularly inside a MG. For example, in some scenarios, a UE may indicate that it does not need a MG for a particular target frequency carrier, but all of the SMTC occasions for that target frequency carrier may fully overlap the applicable MG window. In such a scenario, the particular target frequency carrier must be measured within the MG window, despite the UE not requiring a MG to perform the measurement. In some scenarios, one or more other frequency carriers may also be measured within the MG window, e.g., because the UE indicated that the MG is needed to measure the other frequency carriers. Thus, the CSSF configured for inside the MG may be applied in such conditions, for intra-frequency and/or inter-frequency measurements. The UE and/or network may configure the CSSF to accommodate measurement of the particular target frequency carrier within the MG window, as well as the one or more other frequency carriers. This may increase the total measurement time.

Example Embodiments

In light of the preceding disclosure, various specific embodiments are disclosed, as follows.

A method may be implemented by a user equipment (UE), the method comprising: indicating to a cellular communication network that the UE is not capable of carrier aggregation; determining whether a target measurement object is contained in an active bandwidth part (BWP) configured for the UE; in response to determining that the target measurement object is contained in the active BWP, indicating to the cellular communication network that a measurement gap (MG) is not needed for measuring the measurement object; and in response to determining that the target measurement object is not contained in the active BWP, indicating to the cellular communication network that the MG is needed for measuring the measurement object.

In some examples of the preceding method, the measurement object is a synchronization signal block (SSB).

Some examples of the preceding method further include: determining whether the target measurement object is an intra-frequency object; and in response to determining that the target measurement object is an intra-frequency object, indicating to the cellular communication network that a measurement gap (MG) is not needed for measuring the measurement object, wherein determining whether the target measurement object is contained in the active BWP configured for the UE is performed in response to determining that the target measurement object is not an intra-frequency object.

Some examples of the preceding method further include: in response to determining that the target measurement object is an intra-frequency object, measuring the target measurement object during a first measurement time instance, and measuring a measurement object of a carrier associated with a current serving cell at a second, different measurement time instance.

A method may be implemented by a user equipment (UE), the method comprising: indicating to a cellular communication network that the UE supports per-frequency range (FR) measurement gaps (MGs); determining whether the FR of the first frequency carrier contains at least one current serving cell; indicating to the cellular communication network that no MG is needed for measurement of a first frequency carrier; in response to determining that the FR of the first frequency carrier does not contain at least one current serving cell, determining a measurement period for the first frequency carrier based on a predetermined measurement timing configuration configured by the cellular communication network; and performing at least one measurement of the first frequency carrier according to the determined measurement period.

In some examples of the preceding method, the predetermined measurement timing configuration is a synchronization signal block measurement timing configuration (SMTC).

In some examples of the preceding method, determining the measurement period is further based on a predefined effective measurement gap repetition period (MGRP).

In some examples of the preceding method, determining the measurement period includes determining at least one of: a minimum of the predetermined measurement timing configuration and the effective MGRP; or a maximum of the predetermined measurement timing configuration and the effective MGRP.

In some examples of the preceding method, all configured measurement occasions for the first frequency carrier fully overlap a MG configured for the FR of the first frequency carrier, the method further comprising: applying a carrier-specific scaling factor (CSSF) to adjust the measurement time for the UE to perform channel measurements within the MG.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:
by a user equipment (UE):
indicating to a cellular communication network that the UE supports per-frequency range (FR) measurement gaps (MGs);
determining whether the FR of a first frequency carrier contains at least one current serving cell;

indicating to the cellular communication network that a MG is needed for measurement of the first frequency carrier;

in response to determining that the FR of the first frequency carrier does not contain any current serving cell, determining a measurement period for the first frequency carrier based on a predetermined measurement timing configuration configured by the cellular communication network; and performing at least one measurement of the first frequency carrier according to the determined measurement period.

2. The method according to claim 1, wherein the predetermined measurement timing configuration is a synchronization signal block measurement timing configuration (SMTC).

3. The method according to claim 1, wherein determining the measurement period is further based on a predefined effective measurement gap repetition period (MGRP).

4. The method according to claim 1, wherein determining the measurement period is further based on a per-UE measurement gap repetition period (MGRP).

5. The method according to claim 4, wherein determining the measurement period includes determining at least one of:
a minimum of the predetermined measurement timing configuration and the per-UE MGRP; or
a maximum of the predetermined measurement timing configuration and the per-UE MGRP.

6. The method according to claim 1, further comprising: receiving from the cellular communication network a plurality of per-FR MGs.

7. The method according to claim 1, further comprising receiving from the cellular communication network an assignment to measure a plurality of frequency carriers, the plurality of frequency carriers including the first frequency carrier.

8. The method according to claim 7, further comprising: indicating to the cellular communication network whether a MG is needed for measurement of each respective frequency carrier of the plurality of frequency carriers.

9. A method comprising:
by a cellular communication network:
receiving an indication from a user equipment (UE) that the UE supports per-frequency range (FR) measurement gaps (MGs);
providing to the UE a plurality of FR MGs, responsive to the indication that the UE supports per-FR MGs;
providing to the UE an assignment to measure a first frequency carrier;
determining whether the FR of the first frequency carrier contains at least one cell currently serving the UE;
receiving an indication from the UE that a MG is needed for measurement of the first frequency carrier;
in response to determining that the FR of the first frequency carrier does not contain any cell currently serving the UE, and further in response to receiving the indication that the MG is needed for measurement of the first frequency carrier, determining a measurement period for the first frequency carrier based on a predetermined measurement timing configuration; and
perform measurement scheduling based on the determined measurement period.

10. The method according to claim 9, wherein the predetermined measurement timing configuration comprises a synchronization signal block measurement timing configuration (SMTC).

11. The method according to claim 9, wherein determining the measurement period is further based on a predefined effective measurement gap repetition period (MGRP).

12. The method according to claim 9, wherein determining the measurement period is further based on a per-UE measurement gap repetition period (MGRP).

13. The method according to claim 12, wherein determining the measurement period includes determining at least one of:
a minimum of the predetermined measurement timing configuration and the per-UE MGRP; or
a maximum of the predetermined measurement timing configuration and the per-UE MGRP.

14. An apparatus for performing communication functions in a user equipment (UE) device, the apparatus comprising:
memory, storing software instructions; and
at least one processor configured to execute the software instructions to cause the apparatus to:
provide an indication for transmission to a cellular communication network that the UE device supports per-frequency range (FR) measurement gaps (MGs);
determine whether the FR of a first frequency carrier contains at least one current serving cell;
provide an indication for transmission to the cellular communication network that a MG is needed for measurement of the first frequency carrier;
in response to determining that the FR of the first frequency carrier does not contain any current serving cell, determine a measurement period for the first frequency carrier based on a predetermined measurement timing configuration configured by the cellular communication network; and
perform at least one measurement of the first frequency carrier according to the determined measurement period.

15. The apparatus according to claim 14, wherein the predetermined measurement timing configuration is a synchronization signal block measurement timing configuration (SMTC).

16. The apparatus according to claim 14, wherein determining the measurement period is further based on a predefined effective measurement gap repetition period (MGRP).

17. The apparatus according to claim 14, wherein determining the measurement period is further based on a per-UE measurement gap repetition period (MGRP).

18. The apparatus according to claim 17, wherein determining the measurement period includes determining at least one of:
a minimum of the predetermined measurement timing configuration and the per-UE MGRP; or
a maximum of the predetermined measurement timing configuration and the per-UE MGRP.

19. The apparatus according to claim 14, wherein the at least one processor is configured to execute the software instructions to cause the apparatus to:
receive from the cellular communication network an assignment to measure a plurality of frequency carriers, the plurality of frequency carriers including the first frequency carrier.

20. The apparatus according to claim 19, wherein the at least one processor is configured to execute the software instructions to cause the apparatus to:

provide an indication for transmission to the cellular communication network of whether a MG is needed for measurement of each respective frequency carrier of the plurality of frequency carriers.

\* \* \* \* \*